May 23, 1961 C. J. BROWN 2,985,839

AMPLITUDE LIMITING OF BINARY PULSES WITH ZERO WANDER CORRECTION

Filed Dec. 23, 1958 3 Sheets-Sheet 1

INVENTOR.
CAROLL J. BROWN

BY Robert H. Fraser [signature]

ATTORNEY

May 23, 1961 C. J. BROWN 2,985,839

AMPLITUDE LIMITING OF BINARY PULSES WITH ZERO WANDER CORRECTION

Filed Dec. 23, 1958 3 Sheets-Sheet 2

INVENTOR.
CAROLL J. BROWN

BY Robert H. Fraser

ATTORNEY

AMPLITUDE LIMITING OF BINARY PULSES WITH ZERO WANDER CORRECTION

Filed Dec. 23, 1958

United States Patent Office 2,985,839
Patented May 23, 1961

2,985,839

AMPLITUDE LIMITING OF BINARY PULSES WITH ZERO WANDER CORRECTION

Caroll J. Brown, San Jose, Calif., assignor to International Business Machines Corporation, New York, N.Y., a corporation of New York Filed Dec. 23, 1958, Ser. No. 782,513
10 Claims. (Cl. 328—169)

This invention relates to data processing systems and more particularly to a system for deriving binary coded signals of uniform amplitude from electrical signals fluctuating about a variable mean level.

In many types of well known data processing and digital computer systems, numerical information is represented by binary coded electrical signals having different levels or conditions corresponding to separate binary digital values. For most purposes, in order to distinguish readily between the separate binary values, it is desirable that the two signal levels each be of fixed value with respect to a constant mean. However, in many instances it is found that the binary signals fluctuate with respect to a variable mean with the result that the binary value represented by the binary coded signal cannot be determined by reference to the absolute value of the signal.

Since conventional digital circuitry functions in response to signal levels which are of constant value, binary coded electrical signals which fluctuate about a variable mean level may produce error and malfunction. Although signal clipping circuits are sometimes employed to reshape binary coded electrical signals which are rounded or distorted, known arrangements do not operate satisfactorily where the mean signal level varies.

The problem of a varying mean level is particularly acute in a system in which digital data recorded on film is derived by a scanning technique employing a cathode ray beam. In one such system, the binary information scanned by the cathode ray tube beam is picked up by a photo sensitive detector which provides a binary signal. The binary signal in this instance may be established by the difference between opaque signal areas, which reduce the light detected, and transparent or translucent signal areas, which provide a maximum detected signal. With this arrangement variations in the background of the film may cause variations in the mean level of the binary coded signal derived from the detector. In addition, a variable mean level may arise from a lack of uniform intensity of the cathode ray beam, as well as from a variation in the characteristics of the photosensitive element.

All of the above mentioned factors which tend to create drift in the mean level of the binary signals, however, are relatively slow acting components. That is, they do not materially disturb the amplitude of adjacent individual pulses of the binary data. If the mean level can be adjusted so that a signal clipping operation occurs at the true mean for various pulses, the danger of loss or inaccuracy of information may be largely overcome.

Accordingly, it is a principal object of the present invention to provide an improved circuit for clipping binary data which varies about a mean level subject to drift.

It is another object of this invention to provide an improved circuit for converting data signals of like polarity, having a nominal standard width, and varying in binary fashion about a mean level to clipped signals of rectangular form and selected amplitudes.

Yet another object of this invention is to provide an improved clipping circuit for binary signals, which automatically and rapidly compensates for the drift of the mean level of binary signals to be clipped.

A further object of this invention is to provide an improved circuit for clipping binary signals about a level which is made to follow the true mean level of the binary signals themselves.

In accordance with the present invention, binary coded electrical signals which fluctuate about a mean value are applied to a signal clipping circuit having a controllable reference level. Signals appearing at the output of the clipping circuit are compared with timing signals to derive a control voltage which is applied to the signal clipping circuit to alter the clipping level to correspond to variations in the mean level of the input signals. In a particular arrangement of the invention the time duration of output signals from the clipping circuit corresponding to one given binary value is compared with a timing signal in a phase comparison circuit and a voltage is derived in accordance with the phase comparison which controls the reference level of the signal clipping circuit to maintain the output signals at proper binary signal values.

A better understanding of the invention may be had from a reading of the following detailed description, taken in conjunction with the accompanying drawings, in which like reference numerals refer to like parts and in which.

Figure 1:
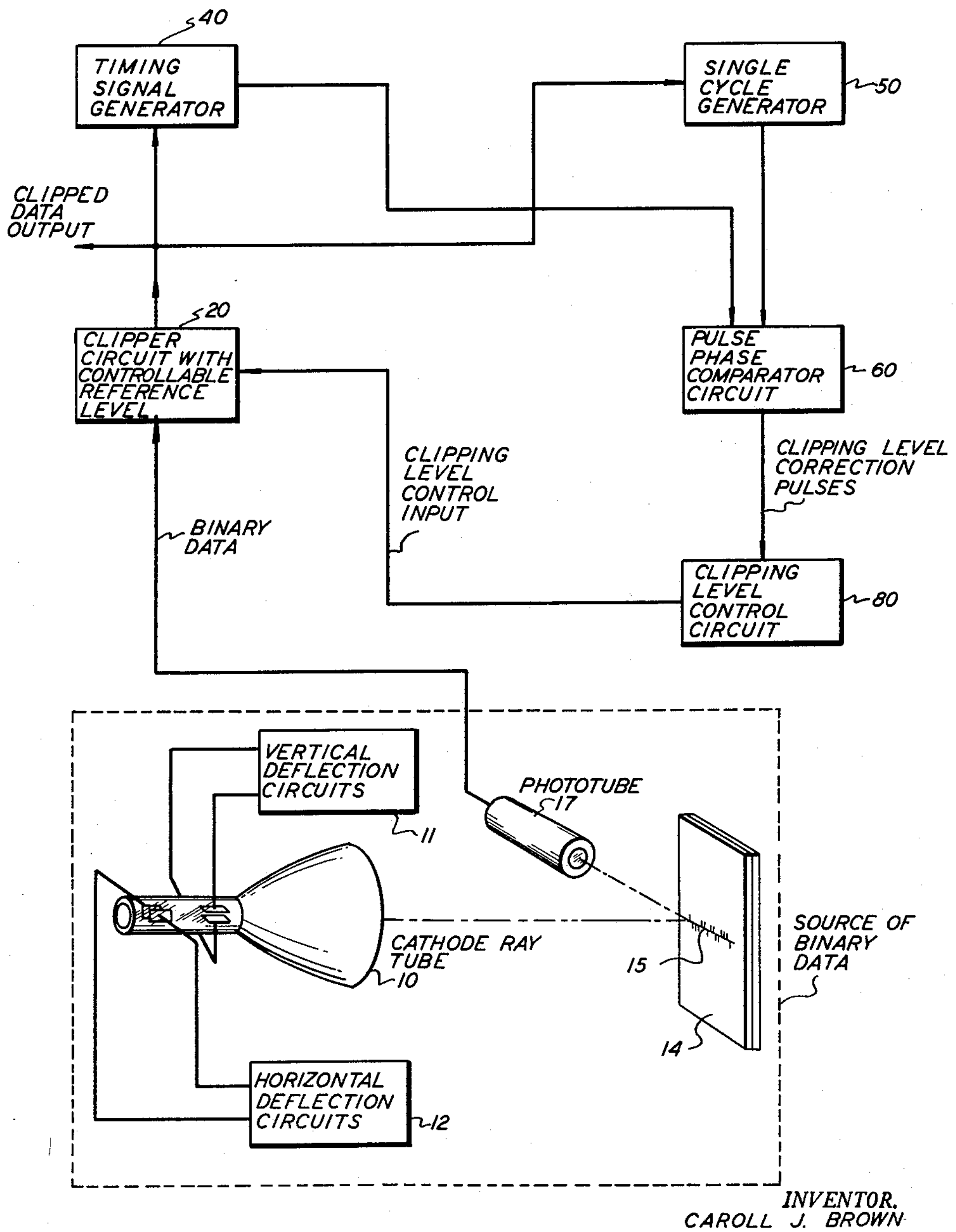
Fig. 1 is a simplified diagrammatic illustration of one arrangement in accordance with the invention.
Figure 2:
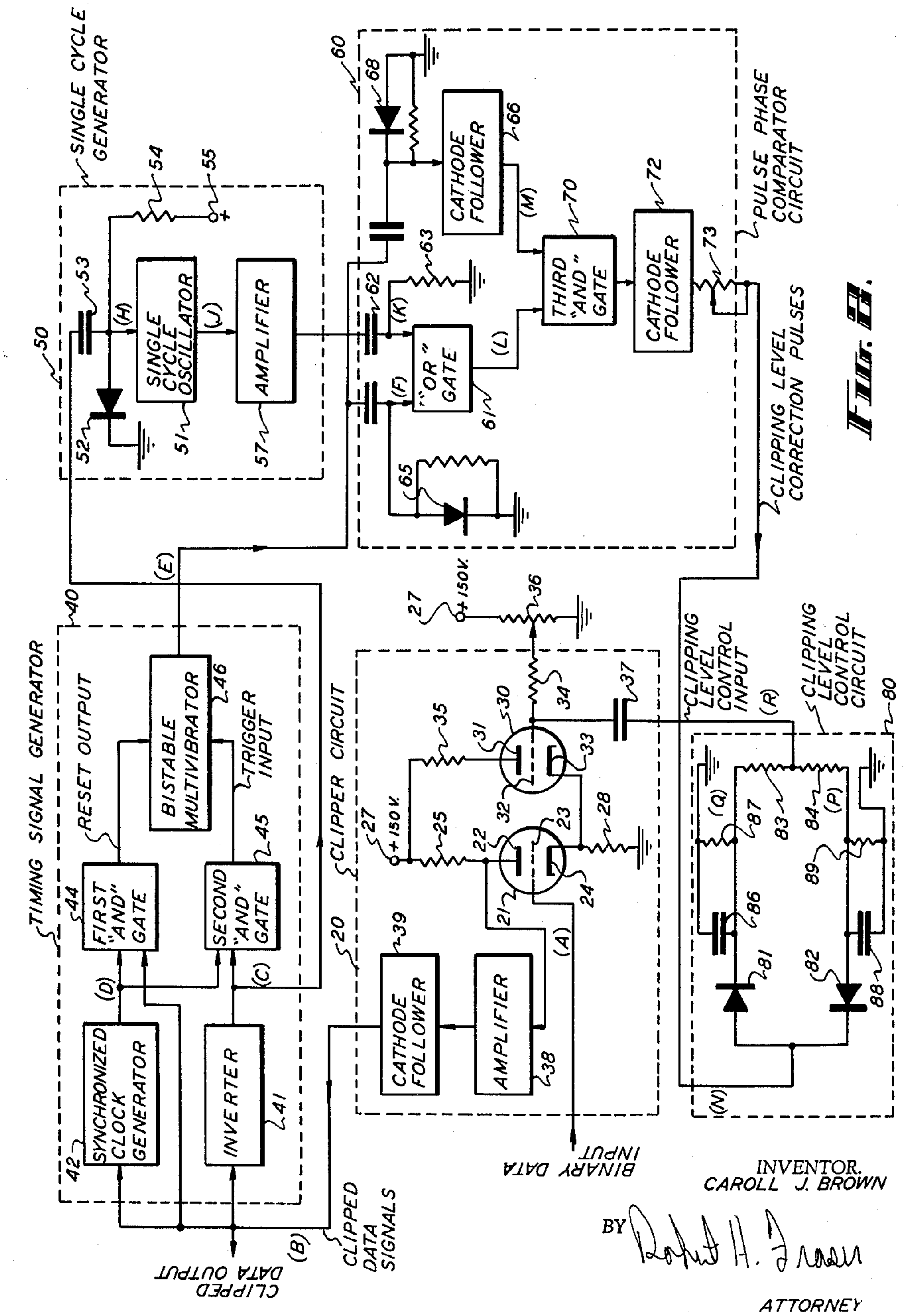
Fig. 2 is a combined block and schematic circuit diagram of circuits which may be employed in the system of Fig. 1.
Figures 3, 4:
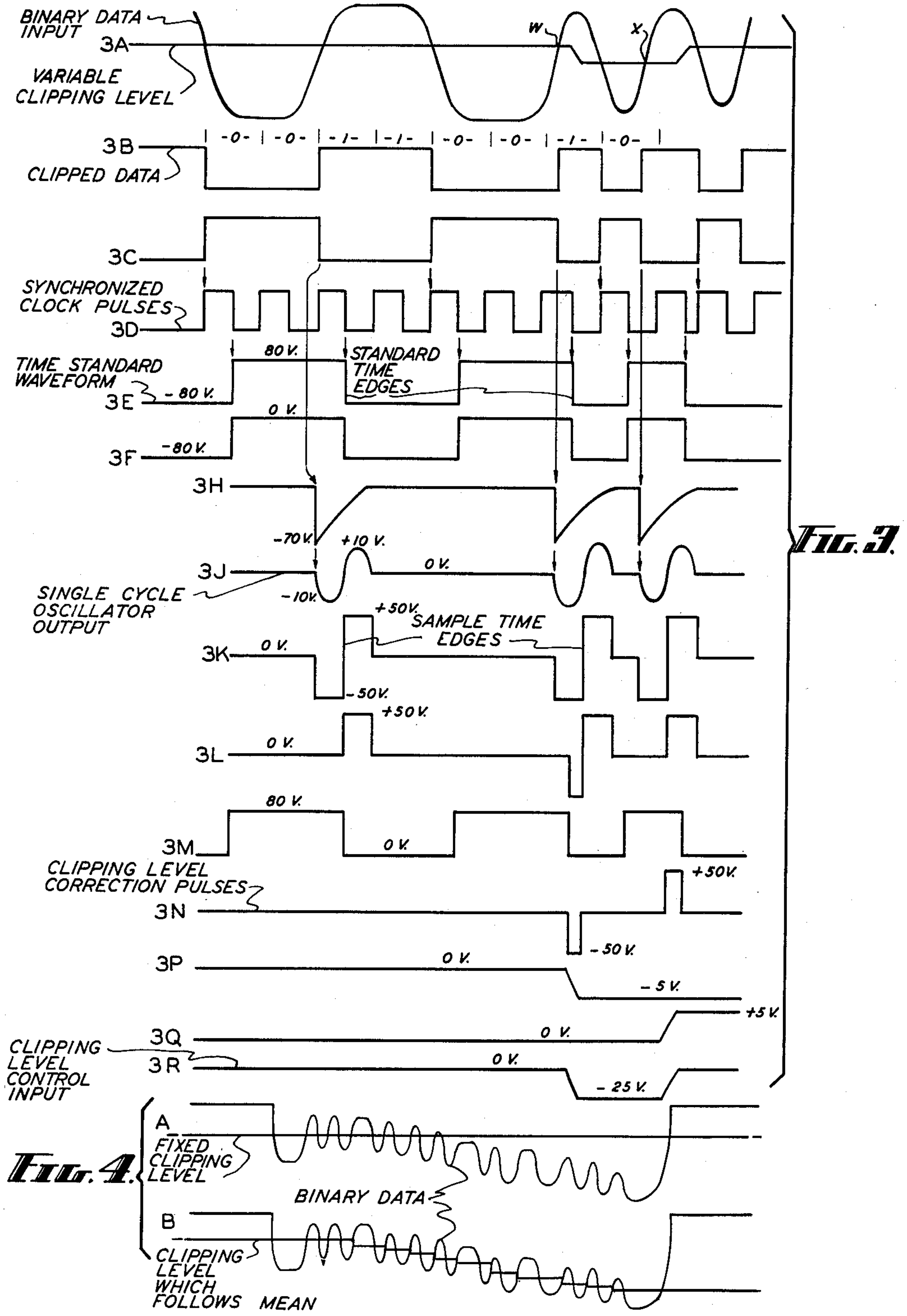

Fig. 3, consisting of waveforms 3A through 3R, illustrates signals which occur at various points in time in the arrangements of Figs. 1 and 2; and Fig. 4, consisting of waveforms 4A and 4B, illustrates the relationship between slow varying binary data and a fixed and varying reference level, respectively, for clipping.

The present invention is particularly adapted to operate in conjunction with a source of binary signals which fluctuate about a varying mean level. One such source is illustrated in the general arrangement of Fig. 1 in which binary signals are generated by means of a scanner in the form of a cathode ray tube 10 having conventional vertical and horizontal deflection circuits, 11 and 12 respectively. A light spot from the face of the cathode ray tube 10 scans a recorded information pattern 15 on a film 14. In practice the cathode ray tube 10 and the pattern 15 may be parts of a system which includes means for gaining access to desired parts of the recorded data and for precisely aligning the recorded data with respect to the cathode ray tube.

The signals to be utilized with the present arrangement, however, may be generated by a photo tube pickup 17 positioned in such manner as to receive incident or reflected light from the cathode ray tube 10 scan of the recorded data 15. The signals which are provided by the photo tube 17 are dependent both upon the recorded pattern and the method of scan which is employed. It is assumed, however, that the information comprises a signal train in binary coded form. Thus, each of two binary states may be represented by two nominally different levels of the signal from the photo tube 17. Here the lower level will be called the binary zero state and the higher level the binary one state. Both the nature of the recorded data 15 and the relatively large size of the beam of the cathode ray tube 10 may produce output pulses which have relatively rounded peaks and slanted sides. The binary data signals are, however, of a selected nominal standard width, determined by the actual width of the bits of information in the pattern 15 and the speed of the scan. In this and similar forms of binary readout systems it has been found that a slow varying component appears along with the binary information. Whether due to a variation in the background of the film, to a change in the beam size or in the relative beam position with respect to the data, to scanning speed or to other influences, the slow varying component usually has the effect of changing the mean level of the binary data. Thus, although the relative difference between the binary levels may remain substantially constant, the absolute level may tend to increase or decrease, as illustrated in the data curves of Fig. 4. The arrangement of the present invention substantially eliminates the problems usually associated with a variable mean level.

The functional circuits in the arrangement of the present invention illustrated in Fig. 1 include a clipper circuit 20 which is responsive on one input to a signal train from the photo tube 17 and responsive on another input to a control signal which governs the clipping level. Thus, the clipper circuit 20 operates to clip signals about a variable, controllable reference level. The clipped data signals from the clipper circuit 20 are applied to a timing signal generator 40 and also to a single cycle generator 50. The timing signal generator 40 operates to generate time standard clock pulses which are synchronized with the data signals from the clipper circuit 20. The trailing edges of the time standard pulses from the timing signal generator 40 are used as a precise marker of the standard width of each successive digital position. A signal corresponding to the actual width of the signals in the binary data is provided through use of a single cycle generator circuit 50 which generates a controlled waveform, also having a period equal to the standard width of the binary data to mark the termination of each binary zero in the signal train from the clipper circuit 20.

It may therefore be seen that a comparison can be made between the expected times of occurrence of the end of one or a series of digital positions identified by the time standard pulses, and the actual termination of each binary zero as identified by the single cycle signals. This comparison is made in the present arrangement by a pulse phase comparator circuit 60 which generates signals for control of the clipping level. The phase comparator circuit 60 generates output pulses for application to a clipping level control circuit 80 in which the pulses are converted to analog, stretched signals. The analog signals are applied to the clipper circuit 20 to control the variable clipping level for the binary data input signals. Thus, a change in width of a data pulse resulting from a drifting binary data signal produces a change in clipping level in a direction which tends to restore a condition in which the data pulse is of standard width. The result is that when the clipping level is adjusted to produce clipped signals of standard width, the clipping level compensates for variations in the mean level of the signal train applied to the clipping circuit 20. Thus, the clipped signals from the clipping circuit 20 are centered about a constant mean and may be applied to logical circuitry in conventional fashion without danger of error or malfunction arising from the variable mean level of the original signal train.

A particularly suitable implementation of the functional units of Fig. 1 is shown in Fig. 2. A signal train comprising rounded or triangular pulses centered about a variable mean may be applied to a clipping amplifier 21 forming a part of the clipper circuit 20. A clamp circuit (not shown) may be used to assist the clipping action and to maintain the base of the data at a given minimum value. The clipping amplifier 21 provides the desired clipping action by being arranged to saturate or cut off quickly for small variations with respect to a reference level. Thus, at each cross-over point of the binary data signals, relative to the reference level, the clipping amplifier provides a positive or negative going edge having a fast rise or fall time. Because the clipping amplifier provides substantially constant levels at saturation and cut-off, rectangular waveforms are provided which are determined by the cross-over points. The reference level at which this clipping is done is varied through the relationship of a clipping control tube 30 and the inputs to the clipper circuit 20. The plate 22 of the clipping amplifier 21 is coupled through a plate load resistor 25 to a positive potential source 27, which may in this instance be a 150 volt supply. The control grid 23 is responsive to the binary data input signals, and the cathode 24 is coupled through a cathode resistor 28 to ground. The clipping control tube 30 is coupled so as to change the clipping reference level of the amplifier 20, having its plate 31 coupled through a plate load resistor 35 to the positive supply 27 and having a common cathode connection between its cathode 33 and the cathode 24 of the clipping amplifier 21. Control input voltages are applied to the control grid 32 of the control tube 31 through a coupling capacitor 37. Control input voltages to the clipping amplifier 21 may be set to vary about a desired quiescent level by the use of adjustable grid bias resistors 34, 36 coupled to the control grid 32 of the clipping control tube 30.

The operation of the clipper circuit 20 provides a train of rectangular pulses corresponding to the rounded pulses of the binary input signals. The clipping amplifier 21 conducts heavily upon application of a signal having an amplitude at or above the reference level of the amplifier 21. The reference level in turn is established through the common cathode connection with the clipping control tube 30. The clipping control tube 30 acts as a cathode follower, and adjusts the level of its cathode 33 and the cathode 24 of the clipping amplifier 21 to correspond to the voltage applied to its control grid 32. Thus, a lowered control voltage causes a drop in the potentials of the coupled cathodes 33 and 24, so that a reduced potential on the control grid 23 of the clipping amplifier 21 produces heavy conduction. This results, effectively, in a change in the reference level and the cross-over point at which the clipping amplifier 21 begins or ceases conduction. Whether conducting, or cut off, the clipping amplifier provides a substantially fixed level signal until the next cross-over point. Thus, the clipping amplifier 21 provides a series of clipped data pulses which are passed by an amplifier 38 and a cathode follower 39. The amplifier 38 in the clipper circuit 20 provides inversion of the clipped data signals, so that the signals correspond in polarity to the binary data input, and the cathode follower 39 provides isolation between the clipper circuit 20 and the succeeding stages.

The timing signal generator 40 is synchronized by the binary signals from the clipper circuit 20. In order for decision circuitry to provide the desired timing pulses, the clipped data is inverted in an inverter circuit 41, the output of which is coupled to the single cycle generator 50. The signals from the clipper circuit 20 are also applied to a self-synchronized clock generator circuit 42. A particular circuit which may conveniently be employed is shown and described in an article entitled "A Self-Clocking System for Information Transfer," by L. D. Seader, at pp. 181–184 of the IBM Journal for April 1957.

The clock generator 42 is self-correcting or synchronizing, in that it utilizes the negative going edges of the clipped signals to initiate its cycle of operation, and thereafter operates periodically until again reset by a negative going edge. The negative going edges are provided at the start of a binary zero signal. The periodicity of the synchronized clock signals corresponds to the basic period of the binary data input and hence, identifies each successive digital position in the signal train. The width of each positive clock pulse comprising a half cycle generated by the clock generator 42 thus corresponds to half of the nominal or standard width of the binary data signals.

The output pulses from the clock generator 42 are applied to individual inputs of first and second two input "AND" gates 44 and 45 respectively. These "AND" gates 44 and 45 may be of any of the "AND" or coincidence gates widely employed in the digital data processing arts. The remaining input of the first "AND" gate 44 is responsive to the clipped signals from the clipper circuit 20. The remaining input of the second "AND" gate 45 is responsive to the inverted clipped signals from the inverter 41.

This arrangement provides output signals from the two "AND" gates 44 and 45 which depend both upon the presence of the clock signals and the nature of the binary data which has been provided by the associated readout equipment. Output signals from the two "AND" gates 44 and 45 are applied to opposite inputs of a trigger circuit, which may comprise a bistable multivibrator 46. Here, the output signals from the first "AND" gate 44 are applied to what may be considered a "reset" input, while the output signals from the second "AND" gate 45 are applied to a "trigger" input of the bistable multivibrator 46. Output signals taken from the side corresponding to the trigger input are utilized as the output of the bistable multivibrator 46. When the trigger input is activated, the corresponding output is assumed to be at a high level as opposed to a relatively low level output in the reset state. Thus, the output signals from the bistable multivibrator 46 are rectangular in form. In the present instance it is assumed that the bistable multivibrator 46 is actuated into the reset and trigger states by the trailing edges of the applied pulses. That is, the negative going edges are utilized to switch states, as by the use of differentiating circuits (not shown) or by other means utilized with conventional bistable multivibrators. The output levels of the multivibrator 46 are here 80 volts when high and −80 volts when low.

The single cycle generator circuit 50 includes a single cycle oscillator 51 which is arranged to operate in well known fashion. The oscillator 51 may have, for example, and L-C circuit (not shown) coupled to its cathode for oscillation generation. With this form of oscillator circuit, a differentiating circuit may be employed consisting of a capacitor 53 and resistor 54 which receive inverted clipped signals from the inverter 41 in the timing signal generator 40. The oscillator 51 input may define a mid-point between the resistor 54 in the differentiating circuit, a positive potential source coupled to the terminal 55, and a positively poled diode 52 coupled to ground.

The arrangement of the differentiating circuit and the positive clamp provided by the diode 52 serves to apply differentiated negative pulses to the oscillator 51, while clamping the input of the oscillator 51 at a given fixed positive potential. The time constant of the differentiating circuit may be selected with respect to the period of the oscillator 51 to terminate the oscillations of the circuit after the first cycle. Although the differentiating circuit and oscillator 51 afford one satisfactory mechanism for generating a single cycle output signal, other known arrangements such as a single-shot multivibrator may be used as well. A high amplitude, rectangular signal may be provided as output from the single cycle generator 50 through use of an amplifier 57 which in the present instance is assumed to be non-inverting. If a large correction signal is not needed or desired, the amplifier 57 need not be employed and the sinusoidal output signal from the oscillator 51 may be used directly. The single cycle output signal of the single cycle generator 50 comprises a negative (here −50 volts) followed by a positive (here +50 volts) pulse. The period of the oscillator 51 is selected to be equal to the standard width of the binary data signals, so that the negative and positive portions are each of half the standard width. The mid-point of each single cycle signal therefore occurs at a fixed time subsequent to the trailing edge of the corresponding succession of binary zeros, a relationship which makes possible comparison of actual pulse widths to standard widths otherwise established.

Pulses which indicate the amount and direction of correction of the reference level which is needed for uniform clipping are provided by the fast-acting pulse phase comparator circuit 60. One input to the phase comparator circuit 60 is derived from the output of the single cycle generator 50 and applied to one input of an "OR" gate 61. A conventional wave shaping circuit, such as a capacitor 62 and resistor 63 combination may be employed to preserve the rectangularity of the applied waveform. The other input of the "OR" gate 61 is derived from the output of the timing signal generator 40. Again, a wave shaping circuit may be employed, but in this instance there is also provided a positively poled clamping diode 65. The clamping diode 65 maintains the input of the "OR" gate 61 which is coupled to the trigger multivibrator 46 at a maximum zero volt level, but permits the −80 volt (low) output to be applied directly, which feature enables the "OR" gate 61 simply to provide its decision making function.

The "OR" gate 61 provides an output signal corresponding to the highest potential which is applied to its input. Accordingly, the "OR" gate 61 provides signals as follows: a zero volt output when the timing signal generator 40 provides a high output (80 volts) and the single cycle generator 50 provides a negative output; a positive output when the timing signal generator 40 provides a low voltage (−80 volts) output and the single cycle generator 50 provides a positive output; and a negative output when the timing signal generator 40 provides a low voltage output and the single cycle generator 50 also provides a low voltage output. This logic could of course be provided by other decision making circuitry, but the present arrangement is extremely compact and efficient.

Outputs from the timing signal generator 40 are also applied to a cathode follower circuit 66. The input to the cathode follower circuit 66 is coupled to ground through a negatively poled diode 68, so that negative signals from the timing signal generator 40 are effectively clamped at the zero volt level at the input to the cathode follower 66. Outputs from both the "OR" gate 61 and the cathode follower 66 are applied to the two inputs of a third "AND" gate 70. When both inputs to the "AND" gate 70 are positive at +80 and +50 volts, the output of the third "AND" gate 70 is positive at +50 volts. When the input to the "AND" gate 70 from the cathode follower 66 is in the low binary state (−80 volts) and the output of the "OR" gate 61 is negative (−50 volts), the "AND" gate 70 provides a negative output. At other times a zero output level is provided. The output signals from the third "AND" gate 70 are applied through an isolating cathode follower 72 to the input of the clipping level control circuit 80. An adjustable potentiometer 73 is used in the output of the cathode follower 72 to allow adjustment of the amount of correction provided by the system.

The clipping level control circuit 80 serves as a signal stretching or signal storage arrangement controlled by the pulses from the phase comparator circuit 60. The control circuit 80 includes a pair of oppositely poled diodes 81 and 82, coupled in parallel to the output of the cathode follower 72. The two oppositely poled diodes 81 and 82 are connected in parallel in a symmetrical fashion to the mid-point of a series pair of like voltage divider resistors 83 and 84. The positively poled diode 81 is coupled to a shunting storage capacitor 86 which is coupled to ground and has a shunting resistor 87. A like shunting capacitor 88 and resistor 89 are also coupled to the negatively poled diode 82. Hereafter, the storage capacitors 86 and 88 may be referred to as the positive and negative storage capacitors respectively. The values of these capacitors 86 and 88 can be made sufficiently large to provide an effective integration or summation of the signals of corresponding polarity from the phase comparator circuit 60, and to preserve the potentials thus established for the normal pulse duration.

A positive pulse from the cathode follower 72, for example, will be applied through the positively poled diode 81 to charge the positive storage capacitor 86 to a proportionate amount. The positive storage capacitor 86 discharges relatively slowly, compared to the standard width cycle, through the associated resistor 83 in the series voltage divider, and thus provides a voltage at the voltage divider mid-point which is the output from the clipping level control circuit 80. This output, when applied through the large smoothing capacitor 37 in the clipper circuit 20 provides a relatively steady state bias signal for the clipping control tube 30. In like manner, but with opposite polarity sense, a negative signal stores a negative charge through the negatively poled diode 82 on the negative storage capacitor 88, and a negative output is provided from the clipping level control circuit 80.

While the arrangement thus far described satisfies a rather complex function, it does so with a minimum of operative elements, and without imposing critical limitations on any of the elements. The manner in which this integrated operation is achieved, however, is dependent upon relationships which may better be understood by reference to the timing diagram of Fig. 3 in conjunction with the block and circuit diagram of Fig. 2. Waveform 3A, for example, illustrates the binary input data, consisting of a series of rounded pulses. These pulses are of the non-return-to-zero form, the same binary level being maintained between pulses as long as the succession of pulses remains at the same binary value. It may be noted that the pulses do not have sharp rise and fall times and that the width of these pulses therefore varies depending upon where the reference is taken. Fig. 3A also illustrates the manner in which a variable clipping reference level, derived as indicated below, can center at the mean level of the pulses, and therefore maintain substantially even clipping.

The succession of waveforms illustrated in Fig. 3 represent what happens at the designated points in the arrangement of Fig. 2 for the binary data conditions illustrated in waveform 3A.

Outputs of the clipper circuit 20, for the rounded waveform representing the binary input data in Fig. 3A, have the rectangular waveform shown in 3B. These clipped data signals, having edges corresponding in time to the cross-over points, are applied to the timing signal generator 40. Accordingly, inverted clipped data is provided, as shown by waveform 3C, from the inverter 41 to the second "AND" gate 45 and also to the single cycle generator 50. As stated previously, the falling or negative going edges of the clipped data waveform (3B) trigger and synchronize the clock generator 42 in the timing signal generator 40. Thereafter, until reset, the clock generator circuit 42 provides a sequence of pulse cycles (3D) which have the nominal or standard width of the binary data. When succeeeding negative going edges of the clipped data waveform (3B) coincide with succeeding positive edges of the clock waveform (3D) the clocking circuit 42 is in synchronism and does not change period. It is reset to begin cycling anew, however, with the same periodicity but a different time base when a later negative going clipped data edge arrives out of synchronism. The logic circuits in the timing signal generator 40 therefore are seen to combine the clock pulses, of waveform 3D, which are synchronized by the clipped data of waveform 3B into a timing waveform which provides time standard pulses (waveform 3E) against which later pulses may be measured.

Basically, these time standard pulses define standard time intervals for each individual or successive group of zeros in the binary data. Because the time standard waveform 3E is established in synchronism with the trailing edges of the clock pulses of waveform 3D, the timing standard pulses are like each single binary zero or succession of binary zeros, but delayed one pulse width from the clipped data of waveform 3B. The other difference is that the timing waveform is of a precisely controlled duration, which is an integral multiple of the standard width cycle of the binary input data. The negative going edge of the time standard pulses are utilized for comparison purposes in the subsequent circuitry, so that these negative going edges may be referred to below as standard time pulse edges.

Waveforms 3F and 3M of Fig. 3 may be seen to be like waveform 3E. Waveform 3F represents the signal which is to be applied to one of the inputs of the "OR" gate 61. This differs from waveform 3E because it is clamped to zero volts, so that the high or positive signal from the trigger 46 does not provide more than the zero volt level at the input of the "OR" gate 61. Conversely, the low level portions of the timing waveform 3E may be clamped to zero volts by a negatively poled diode 68 coupled to the input of the cathode follower 66. This clamping is evident in the levels of the waveform 3M.

The negative going edges of both waveforms 3F and 3M therefore represent continuations of the standard time edges of the time standard pulses of waveform 3E. The single cycle generator 50 generates pulses which denote actual time of subsequent pulses. These subsequent pulses which are utilized are the first binary one signals in the clipped data which immediately follow a binary zero or a series of binary zeros. The actual time sample therefore is taken from the trailing edges of the binary zero sequences. Each falling edge (see waveform 3C) in the inverted clipped data signals causes the differentiating circuit capacitor 53 and resistor 54 to provide a negative pulse (see waveform 3H) to the single cycle oscillator 51. Because the differentiated pulse goes positive in the positive portion of the single cycle oscillation, only one full cycle of oscillation (waveform 3J) is provided. The output of the oscillator 51 when applied through the coupled amplifier 57 is a rectangular waveform (3K) which first goes negative and then goes positive before returning to the intermediate static level.

Each of the negative and positive pulses of this single cycle operation corresponds to half of the standard width cycle of the binary data and thus also to the standard full cycle established by the clock generator 42. The initiation of the single cycle corresponds in time to the rising edge of the clipped data (waveform 3B). Therefore, the positive going edge in the middle of the cycle, hereafter referred to as the sample time edge, can be utilized for comparison to the standard time of waveform 3E. Note that the positive going edge represents actual time of occurrence of the selected binary one signals. Note further that the first half of the cycle in waveform 3K, preceding the sample time edge, is negative, and that the signal following is positive. Thus, the polarity of waveform 3K relative to the standard time edge provides a basis for controlling the direction of the correcting signal.

Comparisons between the relative times of occurrence of each standard time edge of waveforms 3E, 3F and 3M and each sample time edge of waveform 3K are made in the "OR" gate 61 and the third "AND" gate 70 of the phase comparator circuit 60. As previously described, the "OR" gate 61 provides the highest output applied to its inputs. The "OR" gate 61 provides a negative output when the trigger 46 output is low and when the single pulse waveform (3K) is concurrently negative. As a consequence, waveform 3L, which is provided as output from the "OR" gate 61, may be considered to make an initial comparison to determine whether negative correction signals are necessary. A preliminary comparison is made for possible positive correction signals.

The final comparison for positive correction signals however, is made by a coincidence comparison in the "AND" gate 70. Here waveform 3M (the cathode follower signal) is compared to waveform 3L (the "OR" gate output). In one sense, this may be viewed as determining where the positive portions of the output of timing signal generator 40 coincide with the positive portions of the output of the single cycle generator 50. This is a comparison for determining the need for positive correction signals.

In the present example, as shown in waveform 3N, a negative clipping level correction pulse is followed by a positive clipping level correction pulse. The duration of each of these signals is dependent upon the width of the associated binary data relative to the standard width. Each of the signals is representative of the amount and direction of correction which is needed.

These correction pulses (waveform 3N) are converted to analog correction signals in the clipping level control circuit 80. The negative signals are directed through the negatively poled diode 82 and effectively integrated and stored at the negative storage capacitor 88. Positive signals are stored in like manner on the positive storage capacitor 86 through the positively poled diode 81.

As these stored correction signals discharge through the associated resistors 83 or 84 in the voltage divider, they pass the relatively large smoothing capacitor 37 in the clipper circuit 20 to effectively provide a static level as the applied clipping level control. Here the voltage relationships with time which are provided at the negative storage capacitor 88 may be seen as waveform 3P, this waveform decreasing with the negative pulse in waveform 3N and being maintained substantially constant thereafter for a period of time. The positive signals provide waveform 3Q, which results in a positive going edge of substantially constant slope up to a particular amplitude, and thereafter a substantially constant level. The result of these signals, which is the output taken from the mid-point of the relatively equal resistors 83 and 84, is shown as the clipping level control input, waveform 3R, which is applied through the capacitor 37.

The operation of this arrangement in using the relative widths of the clipped data signals to provide a constant correction in the reference level so as to maintain uniform clipping may be observed by comparing the relative widths of the binary input data in Fig. 3 (waveform 3A) to the signals thereafter provided. In waveform 3A, a series of negative signals, denoting binary zeros, is followed by a series of positive binary one signals, then another series of binary zero signals, then alternately, a binary one, a binary zero, a binary one and another binary zero. The first group of binary zeros are of standard width, but the next group of binary zeros are of more than standard width, as a comparison of waveforms 3A and 3D shows. The first individual binary one signal has a cross-over point at its leading edge designated by $w$, while the next succeeding binary one signal has a leading edge cross-over point designated by $x$. Point $w$ marks the termination of the binary zero series which is longer than the standard in duration. Point $x$ marks the termination of the single binary zero which is shorter in duration than the standard. Consequently, the reference level first decreases and then increases to maintain the same mean level relative to the limits in the binary data.

The value of having the reference level follow the mean level of the data may be seen by inspection of Fig. 4, in which waveform 4A shows that binary data would be lost if clipped relative to a fixed reference level, but that, as in waveform 4B, the binary data is fully retained if clipped with reference to a variable level which follows the mean level of the data.

The entire operation may be considered to provide a servo-type of operation. The generation of the time standard pulses from selected portions of the binary data proceeds continuously, and automatically in relation to selected portions of the binary data. Similarly, the other selected binary data portions are used to generate the single cycles which sample actual times of occurrence. Continuous comparisons are made of the width of parts of the binary data relative to a standard width, and correction pulses of the proper polarity are generated for changing the reference level. The correction pulses are of the proper duration for providing the needed amount of correction, and are converted to static reference levels through the clipping level control circuit 80 and the arrangement of the clipping control tube 30 in the clipper circuit 20.

Because this arrangement operates on standard pulse widths, it can be utilized in other environments where the position of a varying mean level with respect to signals can be satisfactorily determined through the use of pulse width. Generally, this arrangement would utilize rounded pulse waveforms, or pulses having sloping leading and trailing edges.

Thus, there has been described an improved system for the conversion and clipping of binary data originally provided in a form in which two binary states vary about a mean level, the mean level itself being subject to change. The width of the data, relative to a reference level, is used to control the level at which the signals are clipped. The arrangement operates extremely reliably, at a high rate of speed, and combines a number of functions in relatively little equipment.

Although a specific embodiment of the invention has been illustrated in the drawings and described in detail above, it will be appreciated that the invention is not limited thereto. Accordingly, any and all modifications, variations or equivalent arrangements falling within the scope of the annexed claims should be considered to be a part of the invention.

What is claimed is:

1. A system for converting input signals comprising pulses having a nominal standard width which are centered in binary fashion about a variable mean level to clipped signals of rectangular form and substantially the standard width including the combination of a clipping circuit operating about a controllable reference level to provide clipped signals corresponding to input signals, a timing signal generator responsive to the clipped signals and providing timing signals which establish time intervals representative of standard width signals, a circuit for generating sample time pulses in response to selected portions of the clipped signals, and comparator means for comparing the phase of a portion of the timing signals with a selected part of the sample time pulses to provide a control signal to control the reference level of the clipping circuit.

2. A system for correcting for drift of the mean level of binary input signals which have a standard unit width including the combination of a clipping circuit which operates with a controllable reference level to provide clipped output signals corresponding to the binary input signals, a timing signal generator responsive to pulse sequences of a given binary value in the clipped output signals for generating corresponding signals which denote the duration of like sequences of standard width, a signal generator circuit responsive to the clipped output signals of the given binary value for providing sample pulses indicative of actual pulse widths, and means responsive to the timing signals and the sample pulses for generating correction signals for controlling the reference level of the clipping circuit in response to the phase relation of the timing signals and the sample pulses.

3. A system for correcting for drifts in the mean level of binary signals of standard width including the combination of a circuit for clipping signals with respect to a controllably variable reference level, said circuit being responsive to the binary signals, a standard time signal generator circuit coupled to the clipping circuit and providing signals which are of the standard width of the binary signals and initiated thereby, an oscillator circuit responsive to the clipped data for providing single full cycle signals which denote in time the actual width of the binary signals, a phase comparator circuit for comparing the relative time of occurrence of the standard time signals to the full cycle signals to develop a pulse representing in polarity and duration the deviations of portions of the clipped data from the corresponding standard width signals, and a correction circuit responsive to pulses from the phase comparator circuit and coupled to the clipping circuit for selectively varying the reference level thereof.

4. A system for correcting for drift of the mean level of binary input signals of a standard width including the combination of a clipping circuit responsive to the binary input signals and generating clipped data signals based upon a controllable reference level, a signal generator circuit providing timing signals in response to the clipped data which precisely denote standard pulse intervals, a circuit for generating sample pulses which denote actual binary signal times in response to the clipped data signals, a phase comparator circuit for comparing the timing signals with the sample pulses to develop pulses which represent in polarity and duration the deviation of binary input signals from the standard width, and a correction signal generator circuit responsive to the pulses and coupled to the clipping circuit for varying the clipping level thereof.

5. A system for converting input data signals from signals of like polarity and a nominal standard width which vary in binary fashion about a mean level subject to drift, to clipped signals having substantially standard width including the combination of a clipping circuit operating with controllable reference levels and responsive to the input data signals for providing clipped data signals, a signal generator circuit providing timing signals in response to the clipped data which establish standard durations for selected binary parts of the clipped data, a circuit for generating sample pulses from selected characteristic portions of the clipped data, the sample pulses having the standard width, and a phase comparison circuit responsive to the timing signals and the sample pulses for generating from the difference thereof a clipping correction signal which establishes the controllable reference level of the clipping circuit.

6. In a circuit for clipping input signals comprising rounded binary pulses which vary about a mean level subject to drift, the combination of means for generating timing signals which denote standard intervals for pulses of a given polarity, means for comparing the time of occurrence of subsequent binary input pulses to the timing pulses to generate correction signals, and means for varying a reference clipping level in accordance with the correction signals.

7. A system for correcting the drift of the mean level of binary input signals of a standard width including the combination of a clipping circuit operating with a controllable reference level and providing clipped data signals in response to the input signals, a timing signal generator providing timing signals which are begun in a fixed relation to the leading edge of given ones of the binary signals, a circuit responsive to the clipped data signals for generating a single full cycle signal of the standard width and having a mid-point in time which has a fixed relation to the leading edge of input signals of the polarity opposite to the given polarity, a phase comparator circuit responsive to the timing signals and to the single full cycle signals for generating clipping correction pulses which represent in polarity and duration the correction in the reference level which will enable clipping at substantially the mean level, and a correction signal generator circuit responsive to the clipping correction pulses and coupled to the clipping circuit for varying the reference level thereof.

8. A system for correcting for drift in the mean level of binary input signals having rounded leading and trailing edges and a nominal standard unit width in which clipped data signals are provided of controlled amplitude and durations which are multiples of the standard width including the combination of a clipping circuit responsive to the binary input signals and operating with a controllable reference level to provide clipped output signals, a source of clock pulses responsive to the clipped data signals and synchronized therewith, means including gating circuits responsive to the clipped output signals and coupled to the source of clock pulses for providing timing pulses which denote the termination of standard width binary zero signals corresponding to binary zero sequences in the input signals, a single cycle oscillator responsive to the clipped output signals for providing a pulse of standard width corresponding to the leading edge of each binary one sequence of signals in the input signals, the mid-point in time of the single cycle signals coinciding with the termination of the associated timing pulse when the input signals are of standard width, gating circuits responsive to the timing pulses and the single cycle signals for comparing the time of occurrence of the timing pulses relative to the single cycle signals for dervinig clipping correction signals which represent in polarity and duration the direction and amount of drift which has occurred in the reference level, and means including signal storage circuits responsive to the clipping correction pulses for generating bias signals to correct the reference level of the clipping circuits.

9. A system for following the mean level of binary input signals having a drifting mean level but a standard width comprising means for generating standard width waveforms corresponding to and initiated by the start of continuous sequences of a given binary value in the input signals, means for generating sample pulses initiated by the termination of the continuous sequences of the given binary value, and means for comparing the time relation of the end of the standard width waveforms to the sample pulses to provide signals indicative of the variation from the mean level.

10. A system for clipping binary data signals in the form of non-return-to-zero binary one and binary zero signals of a determined standard width which vary oppositely about a mean level which is itself subject to drift, said system shifting the clipping level to correspond to the approximate mean data signal level including the combination of a clipping circuit responsive to the binary data signals for clipping the data signals at a level determined by signals applied thereto, a self-phasing clock generator circuit coupled to the clipping circuit and providing clock pulses having half the standard width and having a period equal to the standard width, the phase of the clock generator circuit being controlled by the leading edge of binary zero signals, a first group of gating circuits coupled to the clipping circuit and the clock generator circuit for providing time standard waveforms corresponding to each continuous sequence of binary zeros but delayed one clock pulse width, a single cycle generator circuit providing signals having a period equal to the standard width and coupled to the first group of gating circuits for providing single cycle signals in response to the trailing edge of each continuous sequence of binary zero signals, a second group of gating circuits coupled to the first group of gating circuits and the single cycle generator circuit for comparing the relative time of occurrence of the trailing edges of the time standard waveforms and the midpoint of the concurrent single cycle signal to provide a pulse output indicative in duration and polarity of the width of each continuous sequence of binary zeros relative to the standard width, and a signal storage circuit coupled to the second group of gating circuits and to the clipping circuit for providing correction signals which alter the clipping level of the clipping circuit in a direction and to an extent which restores the data signals to a substantially fixed mean level.

References Cited in the file of this patent

UNITED STATES PATENTS

| | | |
|---|---|---|
| 2,742,568 | Mansson | Apr. 17, 1956 |
| 2,758,278 | Adams | Aug. 7, 1956 |
| 2,787,776 | Rudy | Apr. 2, 1957 |
| 2,788,659 | Rodnor et al. | Apr. 16, 1957 |